United States Patent
Hahn

(10) Patent No.: US 8,020,369 B2
(45) Date of Patent: Sep. 20, 2011

(54) EXPANDED MIXTURE CONTROL FOR REDUCING EXHAUST-GAS EMISSIONS

(75) Inventor: Hermann Hahn, Hannover (DE)

(73) Assignee: Volkswagen AG, Wolfsburg (DE)

( * ) Notice: Subject to any disclaimer, the term of this patent is extended or adjusted under 35 U.S.C. 154(b) by 1240 days.

(21) Appl. No.: 11/619,437

(22) Filed: Jan. 3, 2007

(65) Prior Publication Data

US 2007/0186540 A1      Aug. 16, 2007

(30) Foreign Application Priority Data

Dec. 31, 2005 (DE) .......................... 10 2005 063 207
Jun. 22, 2006 (DE) .......................... 10 2006 028 592
Nov. 3, 2006 (DE) .......................... 10 2006 051 834

(51) Int. Cl.
*F01N 3/00* (2006.01)
*F01N 3/10* (2006.01)

(52) U.S. Cl. ................. 60/285; 60/274; 60/276; 60/299

(58) Field of Classification Search .................... 60/273, 60/276, 284, 285, 295, 299, 274, 277
See application file for complete search history.

(56) References Cited

U.S. PATENT DOCUMENTS

2003/0070420 A1* 4/2003 Uchida ........................... 60/277
2004/0045282 A1* 3/2004 Ide et al. ......................... 60/285
2005/0072139 A1* 4/2005 Kato .............................. 60/285

FOREIGN PATENT DOCUMENTS

DE           103 39 063              2/2005
WO     WO 2005066472 A1 *  7/2005

* cited by examiner

*Primary Examiner* — Thomas Denion
*Assistant Examiner* — Audrey Klasterka
(74) *Attorney, Agent, or Firm* — Kenyon & Kenyon LLP

(57) ABSTRACT

In a method and device for mixture control for an internal combustion engine having at least one catalytic converter disposed in an exhaust system of the internal combustion engine and a λ-closed-loop control, a value being ascertained for the loading of the catalytic converter with oxygen and the mixture being changed as a function of the ascertained value, a first mixture change is made in the direction of rich exhaust gas when the ascertained value of the oxygen loading has increased by more than a first predefined measure within a predetermined time span and/or after throughput of a predetermined quantity of exhaust-gas mass; and/or a second mixture change is made in the direction of lean exhaust gas when the ascertained value of the oxygen loading has dropped by more than a second predefined measure within a predetermined time span and/or after throughput of a predetermined quantity of exhaust-gas mass.

15 Claims, 1 Drawing Sheet

EXPANDED MIXTURE CONTROL FOR REDUCING EXHAUST-GAS EMISSIONS

CROSS-REFERENCE TO RELATED APPLICATIONS

The present application claims priority to Application No. 10 2005 063 207.6, filed in the Federal Republic of Germany on Dec. 31, 2005, Application No. 10 2006 028 592.1, filed in the Federal Republic of Germany on Jun. 22, 2006, and Application No. 10 2006 051 834.9, filed in the Federal Republic of Germany on Nov. 3, 2006, each of which is expressly incorporated herein in its entirety by reference thereto.

FIELD OF THE INVENTION

The present invention relates to methods and devices for mixture control for an internal combustion engine, having at least one catalytic converter disposed in an exhaust system of the internal combustion engine.

BACKGROUND INFORMATION

Various control methods are conventional for maintaining the oxygen content of the exhaust-gas mixture as precisely as possible at a value $\lambda=1$, in order to achieve an optimum catalytic three-way conversion.

The controller approaches differ depending upon the number of catalytic converters used, as well as the quantity and type of $\lambda$-sensors employed. Conventional is a front control loop having a two-step control as a function of the signal from a voltage-jump $\lambda$-sensor, or having a continuous control as a function of the signal from a broadband $\lambda$-sensor upstream of the catalytic converter. For example, in order to correct deviations of the front sensor, often a second control loop (rear control loop) is implemented, which is based on the signals of a $\lambda$-sensor downstream of the catalytic converter. Usually a PI or PID controller is involved.

A problematic disadvantage of these approaches is believed to be that the rear controller first reacts to the mixture with a corrective intervention when the sensor signal exhibits a deviation from the predetermined setpoint value.

However, such a deviation also means that the catalytic converter is not or has not operated in its optimum range, and therefore as a rule is associated with unwanted emissions.

That is why it has already been proposed to record or to model the performance of the catalytic converter to the effect that a corrective intervention is already carried out even before a deviation is detected at the rear sensor. In particular, such an approach usually includes a catalytic-converter model for recording the instantaneously stored oxygen quantity (oxygen model), since the oxygen stored in the catalytic converter substantially influences the conversion and subsequently the reaction of the sensor signal.

Moreover, different methods have been proposed to use information about the instantaneous oxygen state of the catalytic converter for improving the $\lambda$-closed-loop control, e.g., by modification or supplementation of the control algorithms. The problem in these approaches is that a high accuracy of the ascertained instantaneous oxygen state of the catalytic converter is necessary, and the correlation between this oxygen state and the conversion efficiency of the catalytic converter must be described precisely, since otherwise, due to deviations between the real and the modeled performance, the reaction of the controller may be inadequate, therefore leading to unwanted emission of pollutants.

German Published Patent Application No. 103 39 063 describes a method for mixture control in which a breakthrough of pollutants in a catalytic converter is largely avoided by ascertaining the degree to which the catalytic converter is loaded with oxygen, and upon reaching limiting values for the loading, in each case to switch over between rich and lean mixture. A model of the oxygen-storage capacity of the catalytic converter is used, which calculates a value for the oxygen loading of the catalytic converter as a function of input-$\lambda$-values and catalytic-converter parameter values. A change in the mixture is initiated as a function of the calculated value of the oxygen loading and a rich and/or lean breakthrough at the catalytic converter ascertained by the oxygen sensor.

SUMMARY

Example embodiments of the present invention provide for, when working with a mixture control, to easily take into account the dynamic state of the catalytic converter for reducing exhaust-gas emissions.

In the method, at least one value is ascertained for the loading of the catalytic converter with oxygen, the mixture being altered as a function of the ascertained value of the oxygen loading. The engine air/fuel mixture is denoted as a mixture.

Plausibility queries may be initiated in the mixture control which, in response to recognized critical states, bring about an additional change in the mixture as a function of the degree to which the catalytic converter is charged with oxygen and/or critical states which are recognized based on the oxygen-charging state of the catalytic converter and a signal from an exhaust-gas sensor disposed downstream of the catalytic converter. Therefore, a more rapid reaction of the controller may be achieved in order to keep the catalytic converter in an optimal state with regard to its oxygen loading and conversion efficiency.

In the method for mixture control for an internal combustion engine having at least one catalytic converter disposed in an exhaust system of the internal combustion engine and a $\lambda$-closed-loop control, at least one value is ascertained for the oxygen loading of the catalytic converter, a change being made in the mixture as a function of the ascertained value of the oxygen loading. It is further provided that a first mixture change is made in the direction of rich exhaust gas if the ascertained value of the oxygen loading has increased by more than a first predefined measure within a predetermined time span and/or after the throughput of a predetermined quantity of exhaust-gas mass and/or a second mixture change is made in the direction of lean exhaust gas if the ascertained value of the oxygen loading has dropped by more than a second predefined measure within a predetermined time span and/or after the throughput of a predetermined quantity of exhaust-gas mass.

If the ascertained value of the oxygen loading has increased by more than a first predefined measure within a predetermined time span and/or after the throughput of a predetermined quantity of exhaust-gas mass, it is presumed that a critical state of the catalytic converter with too high an oxygen loading exists or will occur in an approaching time interval. A critical state is more likely to be suspected in the case of a given increase within a short time span and/or after throughput of a small quantity of exhaust-gas mass than in the case of an increase within a longer time span and/or after throughput of a greater quantity of exhaust-gas mass. The existence or occurrence of a recognized critical state is counteracted by a change in the mixture with an enrichment of the mixture.

If the ascertained value of the oxygen loading has dropped by more than a second predefined measure within a predetermined time span and/or after the throughput of a predetermined quantity of exhaust-gas mass, it is presumed that a critical state of the catalytic converter with too low an oxygen loading exists or will occur in an approaching time interval. The existence or occurrence of such a critical state is counteracted by a change in the mixture with an enleanment of the mixture.

Therefore, lean or rich breakthroughs of the exhaust gas at the catalytic converter may be avoided or at least their intensity and/or number may be inhibited.

If the first and/or second predefined measure amounts to, e.g., 10%, 20%, 30%, 40% or 50% of a predetermined oxygen loading, it is possible to ensure a high sensitivity of the controller with respect to the change of the oxygen loading using the method.

In addition, it may be provided to alter the mixture as a function of a value of an absolute degree of oxygen loading, to thereby take into account the occurrence of further critical states in the oxygen loading, as well as rapid alterations in the dynamic operation (for example, change between overrun-fuel-cutoff and forced rich-burn phases). It may be provided that the first mixture change only takes place if the absolute degree of oxygen loading is greater than, e.g., 50%, 60%, 70% or 80% of a maximum oxygen loading of the catalytic converter. Further, it may be provided that the second mixture change only takes place if the absolute degree of oxygen loading is less than, e.g., 50%, 40%, 30% or 20% of a maximum oxygen loading of the catalytic converter.

Moreover, it may be provided to utilize the information of an oxygen sensor, mounted downstream of the catalytic converter, for the mixture control.

Furthermore, in a method for mixture control for an internal combustion engine having at least one catalytic converter disposed in an exhaust system of the internal combustion engine, an oxygen sensor located downstream of the catalytic converter and a $\lambda$-closed-loop control, it is provided that: the mixture is changed in the direction of rich exhaust gas, preferably by a predetermined value delta-$\lambda$F, if the value of the oxygen loading lies above a limiting value B1 and the signal of the oxygen sensor deviates from a predetermined setpoint value SMD in the direction of lean exhaust gas, e.g., by at least a predetermined amount deltaM1, and the signal of the oxygen sensor has exceeded a predetermined setpoint value SSA in the direction of rich exhaust gas, e.g., by an amount of at least deltaF1, since the last overrun fuel cutoff phase of the internal combustion engine; and/or the mixture is changed in the direction of lean exhaust gas, e.g., by a predetermined value delta-$\lambda$M, if the value of the oxygen loading lies below a limiting value B2 and the signal of the oxygen sensor deviates from a predetermined setpoint value SFD in the direction of rich exhaust gas, e.g., by at least a predetermined amount deltaF2, and the signal of the oxygen sensor has dropped below a predetermined setpoint value SFB in the direction of lean exhaust gas, e.g., by an amount of at least deltaF2, since the last rich-burn operating phase of the engine.

It is provided that:
delta-$\lambda$F lies in a range of 1 to 3%;
delta-$\lambda$M lies in a range of 1 to 3%;
deltaF1 lies in a range of 50 to 200 mV;
deltaM2 lies in a range of 50 to 200 mV;
deltaF1 lies in a range of 50 to 200 mV;
deltaF2 lies in a range of 50 to 200 mV;
the limiting value of B1 lies in a range of 50 to 80%;
the limiting value B2 lies in a range of 20 to 50%;
setpoint value SMD lies in a range of 550 to 750 mV;
setpoint value SSA lies in a range of 550 to 750 mV;
setpoint value SFD lies in a range of 550 to 750 mV; and/or
setpoint value SFB lies in a range of 550 to 750 mV.

An operation with shut-off fuel feed is denoted as an overrun fuel cutoff phase of the internal combustion engine.

A purposive or forced operation with a mixture having a $\lambda<1$ is denoted as a rich phase of the internal combustion engine.

If the value of the oxygen loading lies above a first limiting value and the signal of the oxygen sensor deviates from a predetermined setpoint value in the direction of lean exhaust gas, this is taken as an indicator for a critical state with too high an oxygen loading, provided the additional condition—that the signal of the oxygen sensor has also exceeded a predetermined setpoint value in the direction of rich exhaust gas since the last overrun fuel cutoff phase of the internal combustion engine—is satisfied. Because of the indicated additional condition, a state of high oxygen loading associated with an overrun fuel cutoff phase does not bring about any mixture change in the direction of rich exhaust gas, thus any additional enrichment reaction of the control. This is in keeping with the knowledge that, as a rule, a state of high oxygen loading associated with an overrun fuel cutoff phase does not represent a critical state of the catalytic converter.

Additionally or alternatively, a mixture change is carried out in the direction of lean exhaust gas if the value of the oxygen loading lies below a second limiting value and the oxygen sensor deviates from a predetermined setpoint value in the direction of rich exhaust gas, under the additional condition that the signal of the oxygen sensor has dropped below a predetermined setpoint value in the direction of lean exhaust gas since the last rich-burn operating phase of the engine. Because of the indicated additional condition, a state of low oxygen loading associated with a rich-burn operating phase does not bring about any mixture change in the direction of lean exhaust gas, thus any additional enleanment reaction of the control. This is in keeping with the knowledge that, as a rule, a state of low oxygen loading associated with a rich-burn operating phase does not represent a critical state of the catalytic converter.

The oxygen loading of the catalytic converter may be ascertained by an oxygen model implemented in a modeling unit.

The $\lambda$-closed-loop control may have one $\lambda$-control loop, the setpoint-$\lambda$-value of the control loop being selected as a function of the ascertained value of the oxygen loading of the catalytic converter. The one signal of the modeling unit may be added to the setpoint value of the $\lambda$-control loop.

The $\lambda$-closed-loop control may have a front $\lambda$-control loop and a rear $\lambda$-control loop, and the rear $\lambda$-control loop processes an output signal of a rear oxygen sensor, forms a differential value delta-$\lambda$H with respect to a rear setpoint-$\lambda$-value, and outputs a manipulated variable acting on the setpoint-$\lambda$-value of the front $\lambda$-control loop.

The predetermined setpoint values SMD, SSA, SFD or SFB may be selected for the rear setpoint-$\lambda$-value.

A signal of the modeling unit may be made available to the rear controller.

A device for implementing the method is also described herein.

According to an example embodiment of the present invention, a method for mixture control for an internal combustion engine including at least one catalytic converter disposed in an exhaust system of the internal combustion engine, and a $\lambda$-closed-loop control, includes: ascertaining a value for loading of the catalytic converter with oxygen; and changing the mixture as a function of the ascertained value, the changing including at least one of: (a) changing the mixture in a direction of rich exhaust gas at least one of (a) when the ascertained value of the oxygen loading has increased by more than a first predefined measure within a predetermined time span and (b) after throughput of a predetermined quantity of exhaust-gas mass; and (b) changing the mixture in a direction of lean exhaust gas at least one of (a) when the ascertained value of the oxygen loading has dropped by more than a second predefined measure within a predetermined time span and (b) after throughput of a predetermined quantity of exhaust-gas mass.

At least one of (a) the first predefined measure and (b) the second predefined measure may be one of (a) 10%, (b) 20%, (c) 30%, (d) 40% and (e) 50% of a predetermined oxygen loading At least one of (a) the first predefined measure and (b) the second predefined measure may be one of (a) 40%, (b) 50% and (c) 60% of a maximum oxygen loading of the catalytic converter.

At least one of (a) the mixture change (a) and (b) the mixture change (b) may be carried out as a function of an absolute oxygen loading of the catalytic converter.

The mixture change (a) may be carried out only if the absolute oxygen loading is greater than one of (a) 50%, (b) 60%, (c) 70% and (d) 80% of a maximum oxygen loading of the catalytic converter.

The mixture change (b) may be carried out only if the absolute oxygen loading is less than one of (a) 50%, (b) 40%, (c) 30% and (d) 20% of a maximum oxygen loading of the catalytic converter.

At least one of (a) the mixture change (a) and (b) the mixture change (b) may be carried out as a function of a signal from an oxygen sensor disposed downstream of the catalytic converter.

According to an example embodiment of the present invention, a method for mixture control for an internal combustion engine including at least one catalytic converter disposed in an exhaust system of the internal combustion engine, an oxygen sensor located downstream of the catalytic converter and a $\lambda$-closed-loop control, includes: ascertaining a value for loading of the catalytic converter with oxygen; changing the mixture as a function of the ascertained value, the changing including at least one of: (a) changing the mixture in a direction of rich exhaust gas, e.g., by a predetermined value delta-$\lambda$F, if the value of the oxygen loading lies above a first limiting value B1 and a signal of the oxygen sensor deviates from a predetermined setpoint value SMD in a direction of lean exhaust gas, e.g., by at least a predetermined amount delta-M1, and the signal of the oxygen sensor has exceeded a predetermined setpoint value SSA in the direction of rich exhaust gas, e.g., by an amount of at least deltaF1, since a last overrun fuel cutoff phase of the internal combustion engine; and (b) changing the mixture in the direction of lean exhaust gas, e.g., by a predetermined value delta-$\lambda$M, if the value of the oxygen loading lies below a second limiting value B2 and the signal of the oxygen sensor deviates from a predetermined setpoint value SFD in the direction of rich exhaust gas, e.g., by at least a predetermined amount deltaF2, and the signal of the oxygen sensor has dropped below a predetermined setpoint value SFB in the direction of lean exhaust gas, e.g., by an amount of at least deltaF2, since a last rich-burn operating phase of the engine.

At least one of the following may be provided: (a) delta-$\lambda$F is in a range of 1 to 3%, (b) delta-$\lambda$M is in a range of 1 to 3%, (c) deltaF1 is in a range of 50 to 200 mV, (d) deltaM2 is in a range of 50 to 200 mV, (e) deltaF1 is in a range of 50 to 200 mV, (f) deltaF2 is in a range of 50 to 200 mV, (g) the limiting value of B1 is in a range of 50 to 80%, (h) the limiting value B2 is in a range of 20 to 50%, (i) setpoint value SMD is in a range of 550 to 750 mV, (j) setpoint value SSA is in a range of 550 to 750 mV, (k) setpoint value SFD is in a range of 550 to 750 mV and (l) setpoint value SFB is in a range of 550 to 750 mV.

The $\lambda$-closed-loop control may include one $\lambda$-control loop, and the setpoint-$\lambda$-value of the control loop may be selected as a function of the ascertained value of the oxygen loading of the catalytic converter.

The $\lambda$-closed-loop control may include a front $\lambda$-control loop and a rear $\lambda$-control loop, and the rear $\lambda$-control loop may process an output signal of a rear oxygen sensor, may form a differential value delta-$\lambda$H with respect to a rear setpoint-$\lambda$-value, and may output a manipulated variable acting on the setpoint-$\lambda$-value of the front $\lambda$-control loop.

At least one of the predetermined setpoint values (a) SMD, (b) SSA, (c) SFD and (d) SFB may correspond to the rear setpoint-$\lambda$-value.

According to an example embodiment of the present invention, a device for mixture control for an internal combustion engine including at least one catalytic converter disposed in an exhaust system of the internal combustion engine, includes: an engine management device including a $\lambda$-closed-loop control, the engine management device adapted to ascertain a value for oxygen loading of the catalytic converter and to change the mixture as a function of the ascertained value, the engine management device adapted to at least one of: (a) change the mixture in a direction of rich exhaust gas at least one of (a) when the ascertained value of the oxygen loading has increased by more than a first predefined measure within a predetermined time span and (b) after throughput of a predetermined quantity of exhaust-gas mass; and (b) change the mixture in a direction of lean exhaust gas at least one of (a) when the ascertained value of the oxygen loading has dropped by more than a second predefined measure within a predetermined time span and (b) after throughput of a predetermined quantity of exhaust-gas mass.

According to an example embodiment of the present invention, a device for mixture control for an internal combustion engine including at least one catalytic converter disposed in an exhaust system of the internal combustion engine and an oxygen sensor located downstream of the catalytic converter, includes: an engine management device including a $\lambda$-closed-loop control, the engine management device adapted to ascertain a value for oxygen loading of the catalytic converter and to change the mixture as a function of the ascertained value, the engine management device adapted to at least one of: (a) change the mixture in a direction of rich exhaust gas, e.g., by a predetermined value delta-$\lambda$F, if the value of the oxygen loading lies above a first limiting value B1 and a signal of the oxygen sensor deviates from a predetermined setpoint value SMD in a direction of lean exhaust gas, e.g., by at least a predetermined amount deltaM1, and the signal of the oxygen sensor has exceeded a predetermined setpoint value SSA in the direction of rich exhaust gas, e.g., by an amount of at least deltaF1, since a last overrun fuel cutoff phase of the internal combustion engine; and (b) change the mixture in the direction of lean exhaust gas, e.g., by a predetermined value delta-$\lambda$M, if the value of the oxygen loading lies below a second limiting value B2 and the signal of the oxygen sensor deviates from a predetermined setpoint value SFD in the direction of rich exhaust gas, e.g., by at least a predetermined amount deltaF2, and the signal of the oxygen sensor has dropped below a predetermined setpoint value SFB in the direction of lean exhaust gas, e.g., by an amount of at least deltaF2, since a last rich-burn operating phase of the engine.

The engine management device may be adapted to at least one of: (a) change the mixture in the direction of rich exhaust gas at least one of (a) when the ascertained value of the oxygen loading has increased by more than a first predefined measure within a predetermined time span and (b) after throughput of a predetermined quantity of exhaust-gas mass; and (b) change the mixture in the direction of lean exhaust gas at least one of (a) when the ascertained value of the oxygen loading has dropped by more than a second predefined measure within a predetermined time span and (b) after throughput of a predetermined quantity of exhaust-gas mass.

Example embodiments of the present invention are described in more detail below with reference to the appended Figure.

DETAILED DESCRIPTION

Figure 1:
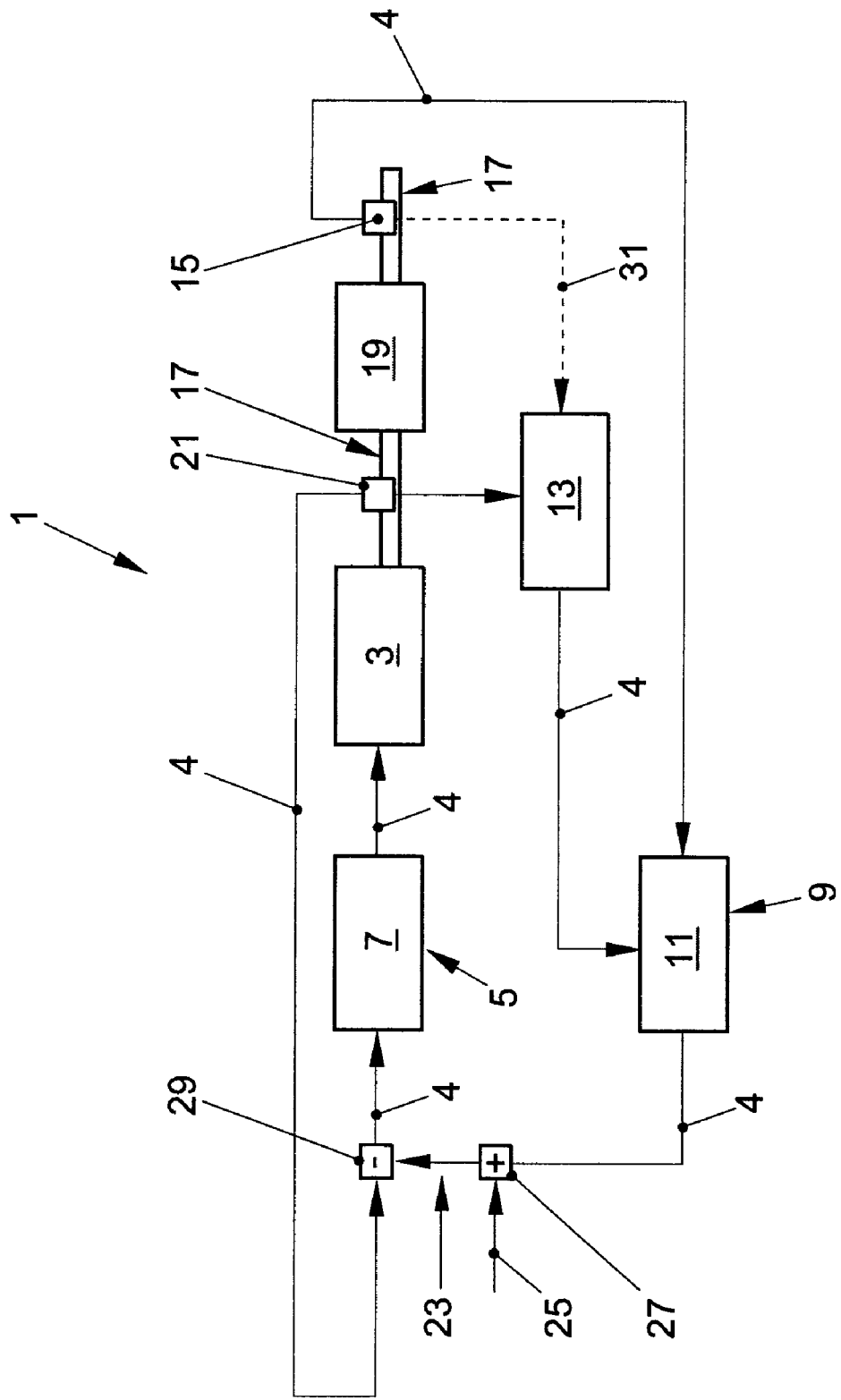
FIG. 1 is a block diagram of a device for $\lambda$-closed-loop control for an internal combustion engine.

FIG. 1 is a block diagram of a device 1 for the $\lambda$-closed-loop control for an internal combustion engine 3.

Signal connections and their direction are identified by arrows 4 in FIG. 1.

Device 1 includes an internal combustion engine 3 having an exhaust system 17 and a three-way catalytic converter 19, and has a front control loop 5 having a front controller 7 and a rear control loop 9 having a rear controller 11. Rear controller 11 is connected on the incoming side to a modeling unit 13 and a rear oxygen sensor 15. A front oxygen sensor 21 is located downstream of internal combustion engine 3 and upstream of catalytic converter 19 in exhaust system 17. For example, oxygen sensors 15, 21 may be voltage-jump sensors and/or broadband sensors.

Example embodiments of the present invention also include other than the control arrangement illustrated in FIG. 1.

In an alternative arrangement, no $\lambda$-sensor 21 is mounted in the front $\lambda$-control loop. Instead, an engine management provides a modeled $\lambda$-value which, for example, is ascertained from engine-related variables such as injected fuel quantity and air quantity as well as adapted setting values and/or complex models, and is used in place of a measured $\lambda$-value.

In an alternative arrangement, only one $\lambda$-control loop is provided.

Device 1, i.e., front control loop 5, has a setpoint-value path 23 having a setpoint-value input 25. A summing point 27 is switched into setpoint-value path 23. Summing point 27 of setpoint-value path 23 is assigned on the incoming side to setpoint-value input 25 and rear controller 11. Consequently, the manipulated variable of rear controller 11 is added to the setpoint value of the $\lambda$-closed-loop control by summing point 27. Thus, a corrective intervention of rear controller 11 acts on the mixture formation of internal combustion engine 3, and therefore on the $\lambda$-value of the exhaust gas of internal combustion engine 3, exclusively via setpoint-value path 23 of front control loop 5.

Front control loop 5 functions independently, is guided by the manipulated variable of rear control loop 9, contains setpoint-value path 23 as well as a subtraction point 29 for forming the system deviation based on the setpoint value supplied via setpoint-value path 23 and the output signal of front oxygen sensor 21, front controller 7, internal combustion engine 3 as well as its exhaust system 17 having front oxygen sensor 21. Rear control loop 9 functions as a primary controller, and therefore includes entire front control loop 5 and, in addition, catalytic converter 19, rear oxygen sensor 15 disposed downstream of the catalytic converter, as well as modeling unit 13.

Using a stored oxygen model, modeling unit 13 ascertains an input signal for rear controller 11. Modeling unit 13 is connected on the incoming side to front oxygen sensor 21. For example, by balance calculation, the oxygen model is able to ascertain the instantaneous relative loading of catalytic converter 19 with oxygen as a conversion characteristic. Moreover, modeling unit 13 is able to ascertain any other arbitrary variable, e.g., the loading with NOx, CO, etc., characterizing the conversion properties of catalytic converter 19. Optionally, modeling unit 13 also has an input for the signal of rear oxygen sensor 15, which is represented by a dotted-line arrow 31.

For example, the charging of the catalytic converter with oxygen is described by a value between 0 and 100%, where 100% describes a catalytic converter completely filled with oxygen. Usually catalytic converters exhibit their maximum three-way conversion efficiency in a specific range, e.g., at a degree of filling of 40 to 60%. However, the distribution of the oxygen over the catalytic converter is also important for the total conversion by the catalytic converter. If one imagines the catalytic converter split into two disks, then the conversion efficiency is the highest when both disks have the optimum filling of, e.g., 40 to 60%, and the conversion efficiency is possibly lower when, for example, the front disk is filled only to 10% and the rear disk is filled to 90%, although on average, the catalytic converter would then have an optimal filling of 50%.

The signal of $\lambda$-sensor 15 located downstream of catalytic converter 19 supplies information about the mixture air ratio downstream of catalytic converter 19, which allows conclusions to be drawn as to the instantaneous oxygen-filling state and the conversion efficiency of the catalytic converter.

The following mixture changes may be provided.

The mixture air ratio is adjusted in the direction of rich exhaust gas when the calculated filling degree of catalytic converter 19 has increased by more than a predefined measure, e.g., 30%, within a predetermined time span and/or after throughput of a predetermined quantity of exhaust-gas mass. In addition, the implementation of this measure may also be made dependent on the absolute degree to which catalytic converter 19 is filled with oxygen and/or the signal from $\lambda$-sensor 15 downstream of catalytic converter 19.

The mixture air ratio is adjusted in the direction of lean exhaust gas when the calculated filling degree of catalytic converter 19 has dropped by more than a predefined measure, e.g., 30%, within a predetermined time span and/or after throughput of a predetermined quantity of exhaust-gas mass. In addition, the implementation of this measure may also be made dependent on the absolute degree to which catalytic converter 19 is filled with oxygen and/or the signal from $\lambda$-sensor 15 downstream of catalytic converter 19.

The mixture air ratio is adjusted in the direction of rich exhaust gas when the calculated filling degree of catalytic converter 19 lies above a setpoint value (that is, more oxygen than desired is stored in catalytic converter 19), and the signal from $\lambda$-sensor 15 downstream of catalytic converter 19 deviates from a predefined setpoint value in the direction of lean exhaust gas, provided the following condition is satisfied:

The signal of $\lambda$-sensor 15 must have exceeded a predefined threshold since the last overrun fuel cutoff phase of engine 3, thus a phase in which engine 3 is operated in unfired fashion, and catalytic converter 19 is filled with air. A threshold may be provided which characterizes rich exhaust gas, e.g., 650 mV.

In addition, the indicated adjustment of the mixture air ratio may be made dependent on the basis that the conditions—that the calculated filling degree of catalytic converter 19 lies above a setpoint value and the signal of $\lambda$-sensor 15 downstream of catalytic converter 19 deviates from a predefined setpoint value in the direction of lean exhaust gas—are fulfilled for a minimum time or a throughput minimum quantity of exhaust gas.

Additionally or alternatively, the mixture air ratio is adjusted in the direction of lean exhaust gas when the calculated filling degree of catalytic converter 19 lies below a setpoint value (that is, less oxygen than desired is stored in the catalytic converter), and the signal from $\lambda$-sensor 15 downstream of catalytic converter 19 deviates from a predefined setpoint value in the direction of rich exhaust gas, and the following condition is satisfied:

The signal of $\lambda$-sensor 15 must have dropped below a predefined threshold, e.g., a threshold which characterizes lean exhaust gas, e.g., 400 mV, since the last rich-burn operating phase of engine 3. In a rich-burn operating phase, engine 3 is intentionally operated more richly than with the stoichiometric three-way air ratio, and catalytic converter 19 is emptied of oxygen.

In addition, it may be provided that the conditions—that the calculated filling degree of catalytic converter 19 lies below a setpoint value and the signal of $\lambda$-sensor 15 downstream of catalytic converter 19 deviates from a predefined setpoint value in the direction of rich exhaust gas—are fulfilled for a minimum time or a throughput minimum quantity of exhaust gas.

List of Reference Numerals 1 device for mixture control
3 internal combustion engine
4 arrow
5 Front control loop
7 front controller
9 rear control loop
11 rear controller
13 modeling unit
15 rear oxygen sensor
17 exhaust system
19 catalytic converter
21 front oxygen sensor
23 setpoint-value path
25 setpoint-value input
27 summing point
29 subtraction point
31 arrow

What is claimed is:

1. A method for mixture control for an internal combustion engine including at least one catalytic converter disposed in an exhaust system of the internal combustion engine, an oxygen sensor located downstream of the catalytic converter and a $\lambda$-closed-loop control, comprising:
ascertaining a value for loading of the catalytic converter with oxygen; and
changing the mixture as a function of the ascertained value, the changing including at least one of:
(a) changing the mixture in a direction of rich exhaust gas when the ascertained value of the oxygen loading has increased by more than a first predefined measure within a predetermined time span;
(b) changing the mixture in a direction of lean exhaust gas when the ascertained value of the oxygen loading has dropped by more than a second predefined measure within a predetermined time span;
(c) changing the mixture in a direction of rich exhaust gas, by a predetermined value delta-$\lambda$F, if the value of the oxygen loading lies above a first limiting value B1 and a signal of the oxygen sensor deviates from a predetermined setpoint value SMD in a direction of lean exhaust gas, by at least a predetermined amount delta-M1, and the signal of the oxygen sensor has exceeded a predetermined setpoint value SSA in the direction of rich exhaust gas, by an amount of at least deltaF1, since a last overrun fuel cutoff phase of the internal combustion engine; and
(d) changing the mixture in the direction of lean exhaust gas, by a predetermined value delta-$\lambda$M, if the value of the oxygen loading lies below a second limiting value B2 and the signal of the oxygen sensor deviates from a predetermined setpoint value SFD in the direction of rich exhaust gas, by at least a predetermined amount deltaF2, and the signal of the oxygen sensor has dropped below a predetermined setpoint value SFB in the direction of lean exhaust gas, by an amount of at least deltaF2, since a last rich-burn operating phase of the engine.

2. The method according to claim 1, wherein at least one of (a) the first predefined measure and (b) the second predefined measure is one of (a) 10%, (b) 20%, (c) 30%, (d) 40% and (e) 50% of a predetermined oxygen loading.

3. The method according to claim 1, wherein at least one of (a) the first predefined measure and (b) the second predefined measure is one of (a) 40%, (b) 50% and (c) 60% of a maximum oxygen loading of the catalytic converter.

4. The method according to claim 1,
wherein at least one of the mixture changes is carried out as a function of a signal from the oxygen sensor.

5. The method according to claim 1, wherein at least one of (a) the mixture change (a) and (b) the mixture change (b) is carried out as a function of an absolute oxygen loading of the catalytic converter.

6. The method according to claim 5, wherein the mixture change (a) is carried out only if the absolute oxygen loading is greater than one of (a) 50%, (b) 60%, (c) 70% and (d) 80% of a maximum oxygen loading of the catalytic converter.

7. The method according to claim 5, wherein the mixture change (b) is carried out only if the absolute oxygen loading is less than one of (a) 50%, (b) 40%, (c) 30% and (d) 20% of a maximum oxygen loading of the catalytic converter.

8. A method for mixture control for an internal combustion engine including at least one catalytic converter disposed in an exhaust system of the internal combustion engine, an oxygen sensor located downstream of the catalytic converter and a $\lambda$-closed-loop control, comprising:
ascertaining a value for loading of the catalytic converter with oxygen;
changing the mixture as a function of the ascertained value, the changing including at least one of:
(a) changing the mixture in a direction of rich exhaust gas, by a predetermined value delta-$\lambda$F, if the value of the oxygen loading lies above a first limiting value B1 and a signal of the oxygen sensor deviates from a predetermined setpoint value SMD in a direction of lean exhaust gas, by at least a predetermined amount delta-M1, and the signal of the oxygen sensor has exceeded a predetermined setpoint value SSA in the direction of rich exhaust gas, by an amount of at least deltaF1, since a last overrun fuel cutoff phase of the internal combustion engine; and (b) changing the mixture in the direction of lean exhaust gas, by a predetermined value delta-$\lambda$M, if the value of the oxygen loading lies below a second limiting value B2 and the signal of the oxygen sensor deviates from a predetermined setpoint value SFD in the direction of rich exhaust gas, by at least a predetermined amount deltaF2, and the signal of the oxygen sensor has dropped below a predetermined setpoint value SFB in the direction of lean exhaust gas, by an amount of at least deltaF2, since a last rich-burn operating phase of the engine.

9. The method according to claim 8, wherein at least one of (a) delta-$\lambda$F is in a range of 1 to 3%, (b) delta-$\lambda$M is in a range of 1 to 3%, (c) deltaM1 is in a range of 50 to 200 mV, (d) deltaM2 is in a range of 50 to 200 mV, (e) deltaF1 is in a range of 50 to 200 mV, (f) deltaF2 is in a range of 50 to 200 mV, (g) the limiting value of B1 is in a range of 50 to 80%, (h) the limiting value B2 is in a range of 20 to 50%, (i) setpoint value SMD is in a range of 550 to 750 mV, (j) setpoint value SSA is in a range of 550 to 750 mV, (k) setpoint value SFD is in a range of 550 to 750 mV and (l) setpoint value SFB is in a range of 550 to 750 mV.

10. The method according to claim 8, wherein the $\lambda$-closed-loop control includes one $\lambda$-control loop, the setpoint-$\lambda$-value of the control loop being selected as a function of the ascertained value of the oxygen loading of the catalytic converter.

11. The method according to claim 8, wherein the $\lambda$-closed-loop control includes a front $\lambda$-control loop and a rear $\lambda$-control loop, and the rear $\lambda$-control loop processes an output signal of a rear oxygen sensor, forms a differential value delta-$\lambda$H with respect to a rear setpoint-$\lambda$-value, and outputs a manipulated variable acting on the setpoint-$\lambda$-value of the front $\lambda$-control loop.

12. The method according to claim 8, wherein at least one of the predetermined setpoint values (a) SMD, (b) SSA, (c) SFD and (d) SFB corresponds to the rear setpoint-$\lambda$-value.

13. A device for mixture control for an internal combustion engine including at least one catalytic converter disposed in an exhaust system of the internal combustion engine and an oxygen sensor located downstream of the catalytic converter, comprising:
an engine management device including a $\lambda$-closed-loop control, the engine management device adapted to ascertain a value for oxygen loading of the catalytic converter and to change the mixture as a function of the ascertained value, the engine management device adapted to at least one of:
(a) change the mixture in a direction of rich exhaust gas when the ascertained value of the oxygen loading has increased by more than a first predefined measure within a predetermined time span;
(b) change the mixture in a direction of lean exhaust gas when the ascertained value of the oxygen loading has dropped by more than a second predefined measure within a predetermined time span;
(c) change the mixture in a direction of rich exhaust gas, by a predetermined value delta-$\lambda$F, if the value of the oxygen loading lies above a first limiting value B1 and a signal of the oxygen sensor deviates from a predetermined setpoint value SMD in a direction of lean exhaust gas, by at least a predetermined amount deltaM1, and the signal of the oxygen sensor has exceeded a predetermined setpoint value SSA in the direction of rich exhaust gas, by an amount of at least deltaF1, since a last overrun fuel cutoff phase of the internal combustion engine; and
(d) change the mixture in the direction of lean exhaust gas, by a predetermined value delta-$\lambda$M, if the value of the oxygen loading lies below a second limiting value B2 and the signal of the oxygen sensor deviates from a predetermined setpoint value SFD in the direction of rich exhaust gas, by at least a predetermined amount deltaF2, and the signal of the oxygen sensor has dropped below a predetermined setpoint value SFB in the direction of lean exhaust gas, by an amount of at least deltaM2, since a last rich-burn operating phase of the engine.

14. A device for mixture control for an internal combustion engine including at least one catalytic converter disposed in an exhaust system of the internal combustion engine and an oxygen sensor located downstream of the catalytic converter, comprising:
an engine management device including a $\lambda$-closed-loop control, the engine management device adapted to ascertain a value for oxygen loading of the catalytic converter and to change the mixture as a function of the ascertained value, the engine management device adapted to at least one of:
(a) change the mixture in a direction of rich exhaust gas, by a predetermined value delta-$\lambda$F, if the value of the oxygen loading lies above a first limiting value B1 and a signal of the oxygen sensor deviates from a predetermined setpoint value SMD in a direction of lean exhaust gas, by at least a predetermined amount deltaM1, and the signal of the oxygen sensor has exceeded a predetermined setpoint value SSA in the direction of rich exhaust gas, by an amount of at least deltaF1, since a last overrun fuel cutoff phase of the internal combustion engine; and
(b) change the mixture in the direction of lean exhaust gas, by a predetermined value delta-$\lambda$M, if the value of the oxygen loading lies below a second limiting value B2 and the signal of the oxygen sensor deviates from a predetermined setpoint value SFD in the direction of rich exhaust gas, by at least a predetermined amount deltaF2, and the signal of the oxygen sensor has dropped below a predetermined setpoint value SFB in the direction of lean exhaust gas, by an amount of at least deltaM2, since a last rich-burn operating phase of the engine.

15. The device according to claim 14, wherein the engine management device is adapted to at least one of:
(a) change the mixture in the direction of rich exhaust gas at least one of (a) when the ascertained value of the oxygen loading has increased by more than a first predefined measure within a predetermined time span and (b) after throughput of a predetermined quantity of exhaust-gas mass; and
(b) change the mixture in the direction of lean exhaust gas at least one of (a) when the ascertained value of the oxygen loading has dropped by more than a second predefined measure within a predetermined time span and (b) after throughput of a predetermined quantity of exhaust-gas mass.

* * * * *